(12) United States Patent
Field

(10) Patent No.: US 9,760,934 B1
(45) Date of Patent: Sep. 12, 2017

(54) SYSTEM AND METHOD FOR INTELLIGENT GIFT REGISTRY

(71) Applicant: JPMorgan Chase Bank, N. A., New York, NY (US)

(72) Inventor: Manning R. Field, Media, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 998 days.

(21) Appl. No.: 14/036,236

(22) Filed: Sep. 25, 2013

Related U.S. Application Data

(60) Provisional application No. 61/821,473, filed on May 9, 2013.

(51) Int. Cl.
  *G06Q 30/00* (2012.01)
  *G06Q 30/06* (2012.01)

(52) U.S. Cl.
  CPC .................. *G06Q 30/0631* (2013.01)

(58) Field of Classification Search
  CPC .......................................... G06C 30/06–30/08
  USPC ................................................ 705/26.1–27.2
  See application file for complete search history.

(56) References Cited

U.S. PATENT DOCUMENTS

| | | | | |
|---|---|---|---|---|
| 6,810,356 B1* | 10/2004 | Garcia-Franco | ...... | H04L 41/142 379/133 |
| 2013/0211954 A1* | 8/2013 | Linden | ............... | G06Q 30/0621 705/26.8 |
| 2014/0229321 A1* | 8/2014 | Ranganath | ............. | G06Q 50/01 705/26.7 |
| 2014/0279205 A1* | 9/2014 | Ganesh | .................. | G06Q 50/01 705/26.7 |

* cited by examiner

*Primary Examiner* — Ethan D Civan
(74) *Attorney, Agent, or Firm* — Hunton & Williams LLP

(57) ABSTRACT

Systems and methods for intelligent gift registries are disclosed. In one embodiment, a method for using an intelligent gift registry may include: (1) receiving, from a gift receiver, an identification of at least one gift receiver interest; (2) receiving, from a gift giver, an identification of at least one gift giver interest; (3) at least one computer processor generating a gift giving suggestion list comprising at least one gift giving suggestion and based on the at least one gift receiver interest and the at least one gift giver interest; (4) providing, to the gift giver, the gift suggestion list; and (5) receiving, from one of the gift giver, a gift selection.

13 Claims, 3 Drawing Sheets

SYSTEM AND METHOD FOR INTELLIGENT GIFT REGISTRY

RELATED APPLICATIONS

This patent application is related to U.S. Provisional Patent Application Ser. No. 61/821,473, filed May 9, 2013, the disclosure of which is incorporated by reference in its entirety.

BACKGROUND OF THE INVENTION

1. Field of the Invention

The present invention generally relates to gift registries, and, more particularly, to a system and method for intelligent gift registry.

2. Description of the Related Art

The selection of a gift, other than a gift card, can be a long and difficult process. In today's world, a gift giver typically may not have time to identify and purchase a gift that the gift receiver would like to receive, or to check with the gift receiver's family and friends to see if the gift is something that the receiver would want.

SUMMARY OF THE INVENTION

Systems and methods for intelligent gift registries are disclosed.

In one embodiment, a method for using an intelligent gift registry may include: (1) receiving, from a gift receiver, an identification of at least one gift receiver interest; (2) receiving, from a gift giver, an identification of at least one gift giver interest; (3) at least one computer processor generating a gift giving suggestion list comprising at least one gift giving suggestion and based on the at least one gift receiver interest and the at least one gift giver interest; (4) providing, to the gift giver, the gift suggestion list; and (5) receiving, from one of the gift giver, a gift selection.

In one embodiment, the computer processor may identify at least one common interest from the at least one gift receiver interest and the at least one gift giver interest; and may generate the gift giving suggestion list based on the at least one common interest.

The method may further include receiving, from the gift receiver, an identification of at least one source for gift receiver interest information, and the source for gift receiver interest information may be an issuer of a gift receiver credit card, a social network website, a family member, a friend, a social network contact, etc.

In one embodiment, the method may further include receiving, from the at least one source of gift receiver interest information, information about a past gift received by the gift receiver, etc.

In one embodiment, the method may further include the at least one computer processor determining at least one supplier for the selected gift; and completing the transaction for the selected gift.

In one embodiment, the method may further include receiving, from the gift receiver, at least one gift idea for the gift receiver, and the gift giving suggestion list may be further based on the at least one gift idea for the gift receiver received from the gift receiver.

In one embodiment, the method may further include receiving, from the gift receiver, an identification of at least one favorable gift received by the gift receiver, and the gift giving suggestion list may be further based on the at least one favorable gift.

In one embodiment, the method may further include receiving, from the gift receiver, an identification of at least one unfavorable gift received by the gift receiver, and the gift giving suggestion list may be further based on the at least one unfavorable gift.

In one embodiment, the method may further include receiving, from the gift receiver, an identification of at least one social network that the gift receiver is a member; the at least one computer processor accessing the at least one social network; and identifying at least one of a gift received by the gift receiver and an interest of the gift receiver. The gift giving suggestion list may be further based on the at least one of a gift received by the gift receiver and an interest of the gift receiver.

According to another embodiment, a method for creating an intelligent gift registry may include (1) receiving, from a gift receiver, gift receiver information, the gift receiver information comprising at least one of a gift receiver identifier, at least one gift receiver gift date, and gift receiver demographic data; (2) receiving, from the gift receiver, an identification of at least one gift receiver interest; (3) receiving, from the gift receiver, an identification of at least one source for gift receiver interest information; (4) receiving, from the gift receiver, an identification of at least one source for gift receiver purchase information; (5) at least one computer processor retrieving, from at least one of the source of gift receiver interest information, the source for gift receiver purchase information, and the source for gift receiver purchase information, at least one of gift receiver information and gift receiver purchase information; and (6) at least one computer processor generating a gift giving suggestion list comprising at least one gift giving suggestion and based on at least one of the gift receiver information, the gift receiver interest, the gift receiver interest information, and the gift receiver purchase information.

In one embodiment, the method may further include providing the gift receiver with the gift giving suggestion list; receiving at least one change to the gift giving suggestion list from the gift receiver; and the at least one computer processor updating the gift giving suggestion list based on the at least one change to the gift giving suggestion list.

In one embodiment, the method may further include the at least one computer processor retrieving, from a database, at least one gift idea based on the gift receiver demographic data, and the gift giving suggestion may be further based on at least one gift idea.

In one embodiment, the source for gift receiver interest information may be a social network website, a family member, a friend, a social network contact, etc.

In one embodiment, the method may further include receiving, from the at least one source of gift receiver interest information, information about a past gift received by the gift receiver, etc.

In one embodiment, the at least one source for gift receiver purchase information may be an issuer of a gift receiver credit card.

In one embodiment, the method may further include providing, to at least one gift giver, the gift giving suggestion list at a predetermined time before the least one gift receiver gift date.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
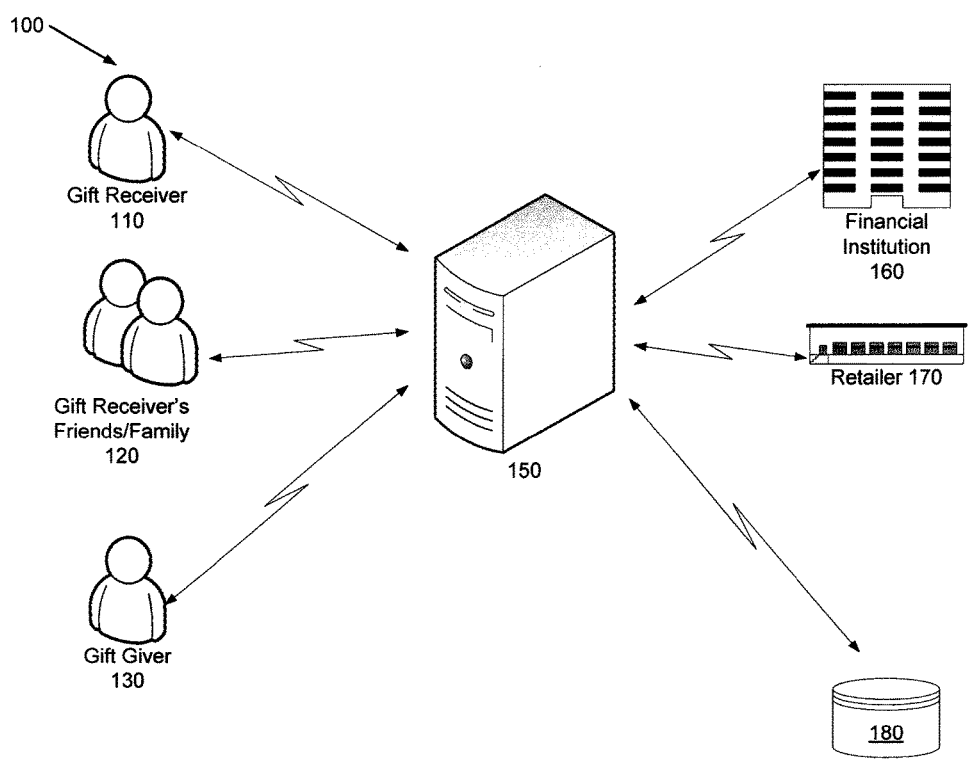
FIG. 1 is a block diagram of a system for an intelligent gift registry according to one embodiment.
Figure 2:
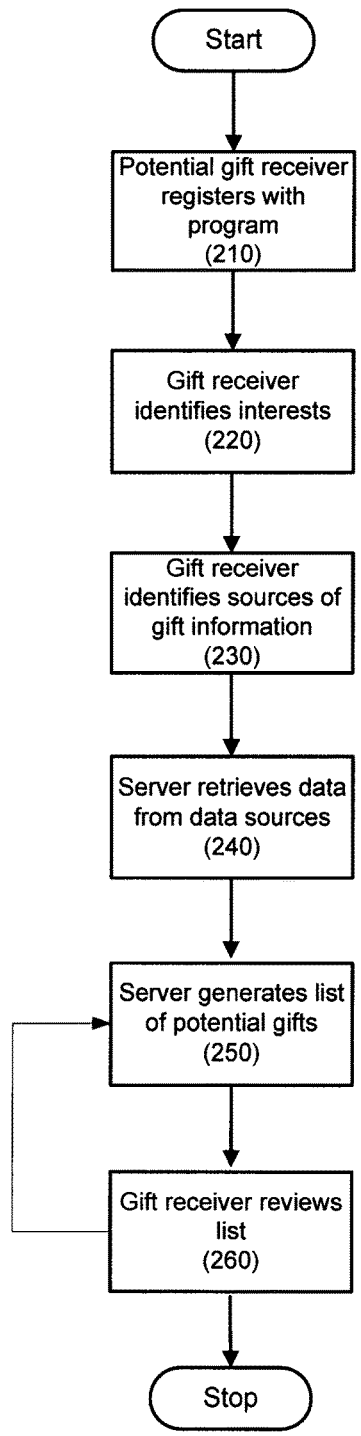
FIG. 2 is a flowchart depicting a method of generating an intelligent gift registry according to one embodiment.
Figure 3:
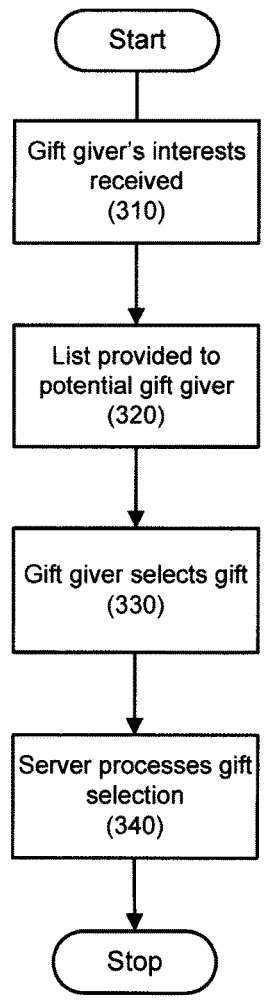
FIG. 3 is a flowchart depicting a method for using an intelligent gift registry according to one embodiment.

Several embodiments of the present invention and their advantages may be understood by referring to FIGS. 1-3, wherein like reference numerals refer to like elements.

Systems and methods for intelligent gift registries are disclosed. The systems and methods are generally directed to providing a gift giver with a list of gift ideas that a gift receiver and/or the gift giver may consider to be "thoughtful" gifts. A "thoughtful" gift may be a gift that the gift giver believes that a gift receiver would like to receive and that the gift giver feels good giving to the gift receiver. The selection of the gift may give the appearance to the gift receiver, and maybe others, that the gift giver spent considerable time and effort identifying the gift, while the gift giver actually spent little time selecting, purchasing, and delivering the "thoughtful" gift.

In one embodiment, data from the gift receiver and from external sources, such as the gift receiver's social media entries, input from the gift receiver's family and friends, the gift receiver's prior purchases, etc., may be leveraged by a computer application (mobile or otherwise) that identifies the gift receiver's interests and generates a list of possible gifts that are appropriate for the gift receiver.

The gift receiver may elect to "opt into" the program, enroll in the program, etc. After that, the gift receiver's social media sites (e.g., Facebook, Twitter, etc.) may be analyzed to determine likes, interests, etc. In addition, a gift receiver's purchase and/or browsing history (e.g., credit card purchases, purchases from Amazon.com, eBay, rewards sites, etc.) may be reviewed to determine the gift receiver's interests based on those purchases. Because some purchases may be made for others (e.g., the gift receiver purchased books for children), outlier purchases may be identified and removed from further consideration.

In one embodiment, the application may directly request input from the gift receiver's family, friends, acquaintances, social network contacts, etc. to identify the gift receiver's interests and/or potential gifts. For example, the application may contact family and friends and ask them if the gift receiver would be interested in certain gifts. It may also present images of different types of gifts and ask the family or friend to select the most appropriate gift for the gift receiver.

In one embodiment, the gift receiver may identify causes that he or she may request a contribution to in lieu of a gift.

The gift receiver may also identify his or her interests. The gift receiver may also provide a "wish list" of gifts, a bucket list of things the gift receiver wants to do, etc.

The application may further consult gift databases, public and private surveys, registries from similarly situated persons, etc. including on-line databases, to identify gifts that may be of interest to the demographics, interests, etc. of the gift receiver.

From any or all of these sources, the application may generate and provide a list of gifts to the gift giver. The application may provide the gift giver with the ability to make the purchase and have the gift giftwrapped and sent to the gift receiver.

In one embodiment, the application may consider the gift giver's interests, hobbies, etc. in identifying gift(s) for the gift giver. In on embodiment, this may be from the gift giver's own gift list. In another embodiment, the gift giver may separately identify his or her interests. For example, if the gift giver and the gift receiver both are interested in golf, the application may identify golf-related gifts for the gift giver to consider. In another embodiment, gifts of common interest may be presented in the list before other gifts.

The application may maintain a gift registry of sorts, so as a gift is purchased, it is removed from the list.

The gift receiver may also have the ability to remove suggested gifts from the gift list.

Referring to FIG. 1, a block diagram of a system for an intelligent gift registry according to one embodiment is provided. System 100 may include gift receiver 110, the gift receiver's family/friends 120, gift giver 130, sever 150, financial institution 160, retailer 170, and database 180.

In one embodiment, gift receiver 110 may be an individual. In another embodiment, gift receiver 110 may be a pet, an organization, a charity, a group of individuals, a team, a foundation, a company, an organization on behalf of an individual, etc.

In one embodiment, gift receiver 110 may identify its interests, lifestyle, hobbies, gifts that gift receiver 110 desires, gifts that gift receiver 110 does not want, gifts that gift receiver 110 has received in the past and liked, gifts that gift receiver 110 has received in the past and not liked, gifts that gift receiver 110 has received in the past and returned, sizes, favorite colors and styles, disliked colors and styles, etc.

In one embodiment, gift receiver 110 may further provide information on shopping habits, on-line purchases (including access to online accounts), on-line subscriptions (e.g., media sources, etc.), social networks, etc.

In one embodiment, gift receiver 110 may identify potential dates for gift receiving, such as his or her birthday, anniversary, graduation, wedding, religious holidays, other personal events, etc.

Gift receiver's family/friends 120 may be any individuals, groups of individuals, organizations, etc. that may able to provide some insight into gift receiver 110. In one embodiment, gift receiver's family/friends 120 may be identified by gift receiver 110. In another embodiment, gift receiver's family/friends 120 may be identified from gift receiver 110's contacts, social networking sites, etc.

In one embodiment, family/friends 120 may include gift receiver 110's immediate family, extended family, friends, co-workers, acquaintances, social network contacts, and anyone who may be able to identify gift receiver 110's interests, hobbies, etc.

In one embodiment, gift receiver's family/friends 120 may identify what they perceive to be gift receiver 110's interests, lifestyle, hobbies, desired gifts, etc. Family/friends 120 may also provide information on items that gift receiver 110 may has received, examples of gifts that have been well-received, examples of gifts that have not been well-received, etc. In one embodiment, family/friends 120 may identify potential gift dates for gift receiver 110 if not already provided. In one embodiment, the gift dates may be kept secret from gift receiver 110 and any other potential gift providers as necessary and/or desired.

Gift giver 130 may be any individual, organization, group of individuals, team, foundation, company, etc. that desires to provide a gift to gift receiver 110. In one embodiment, some (or all) of gift receiver's family/friends 120 may also be gift givers.

Financial institution 160 may be any financial institution that may host one or more financial accounts for gift receiver 110. For example, financial institution 160 may be a bank, credit card issuer, credit union, insurance company, payment facilitator, etc. In one embodiment, financial institution 160 may sponsor, host, etc. server 150 and/or the intelligent gift registry system.

Server 150 may be any suitable computing device that can communicate with, or receive information from, directly or indirectly, one or more of gift receiver 110, gift receiver's family/friends 120, gift giver 130, financial institution 160, retailer 170, and database 180, and any participant.

Retailer/provider 170 may be a single or group of retailers that gift receiver 110 has patronized. For example, retailer/provider 170 may be any suitable retailer, including brick-and-mortar retailers, on-line retailers, etc. In one embodiment, retailer/provider 170 may host a gift registry for gift receiver 110. In another embodiment, retailer/provider 170 may provide server 150 with an identification of any items purchased by gift receiver 110. In still another embodiment, retailer/provider 170 may provide gift suggestions for gift receiver 110.

In one embodiment, retailer/provider 170 may provide digital items to gift receiver 110. For example, retailer/provider 170 may be a media provider (e.g., satellite/cable TV provider, entertainment provider (e.g., Netflix, Hulu, Amazon, AppleTV, Roku), audio provider (e.g., iTunes, Amazon), ebook provider, application provider (e.g., Apple's App store, Google Play store), etc.

In another embodiment, retailer/provider 170 may include social network sites (e.g., Facebook, Pinterest, Four Square, etc.).

In one embodiment, retailer/provider 170 may host and/or sponsor server 150 and/or the intelligent gift registry system.

In one embodiment, retailer/provider 170 may fulfill a gift order request from gift giver 130.

Database 180 may store gift, interest, hobby, etc. information about gift receiver 110. One or more databases 180 may be provided. In one embodiment, database 180 may store gift lists, survey data, or any data that may be considered in generating a gift list.

Referring to FIG. 2, a flowchart depicting a method for generating an intelligent gift registry according to one embodiment is provided. In step 210, a potential gift receiver registers with a gift program. In one embodiment, the gift receiver may enter personal information and potential gift dates (e.g., name, address, demographics, birthday, anniversary, etc.). In another embodiment, some or all of the personal information may be retrieved from a third party (e.g., the sponsor, a financial institution, social networking sites, etc.).

In one embodiment, in step 220, the gift receiver may identify his or her interests, gifts that he or she would like, etc. The gift receiver may also identify gifts that the gift receiver would not like to receive and/or things that the gift receiver is not interested in receiving.

In one embodiment, prompts may be provided to assist the gift receiver in identifying his or her interests, hobbies, gifts, etc. In one embodiment, a series of interactive questions may be used to assist in identifying interests, hobbies, gifts, etc.

In one embodiment, an interface, such as drop down menus, etc., may be used to assist the gift receiver in identifying potential gifts that are associated with an identified interest. For example, if a gift receiver selects "golf" as an interest, the gift receiver may further select from "clubs," clothing," "accessories," "trips," "golf rounds," "tickets to events," "exotic destinations," etc. If the gift receiver selects "clubs," then clubs such as "woods," "irons," and "putters" may be listed. From there, specific manufacturers may be provided. At any point in the menus, the gift receiver may stop, capturing as small or as large a field of potential gifts as the gift receiver wishes.

In one embodiment, the gift receiver may add items to his or her list of potential gifts as they are identified. For example, a user may scan a bar code for a potential gift, take a picture of a potential gift, etc. using the gift receiver's mobile device, Google Glass, etc. In one embodiment, the picture may not need to be of a specific item, but may be of a generic item, for example, a bicycle, golf club, etc.

The gift receiver may be provided with the number of potential gifts for each menu level. As the gift received further narrows the search, the number of potential gifts may decrease.

In step 230, the gift receiver may identify other sources of information about the gift receiver's interests, past or future gifts, purchase history, browsing history, reading habits and reading history, etc. In one embodiment, the gift receiver may provide access to his or her social networking accounts, financial accounts (e.g., credit card purchase information), on-line shopping accounts (e.g., Amazon.com, eBay, Buy.com, etc.), travel accounts (e.g., airline accounts, hotel accounts), loyalty accounts, on-line subscriptions (e.g., satellite/cable television providers), streaming media (e.g., Netflix, Hulu), video rentals (e.g., Redbox, Netflix, Blockbuster), private label accounts, etc.

In step 240, an application executed on a mobile device, a server, or any other suitable device may retrieve data from the data sources.

In step 250, the application may generate a list of potential gifts for the gift receiver. In one embodiment, the application may consider statistical modeling based on the information received from the gift receiver, the information retrieved from the gift receiver's social networks, third parties, etc. Any sources of information may be considered as necessary and/or desired.

In one embodiment, survey data may be considered. In one embodiment, the survey data may be gathered from other customers of the sponsoring institution, such as a financial institution. In another embodiment, the survey data may be purchased survey data. In still another embodiment, the survey data may be public survey data.

In one embodiment, the demographic profile of the gift receiver may be matched with individuals having a similar demographic profile to identify potential gifts.

In another embodiment, seasonal information may be considered. For example, a gift receiver may not wish to receive a new golf club at the end of the season.

In one embodiment, the application may identify expendable items, such as golf balls, tennis balls, etc. and may periodically add those to the list, change their position on the list, etc.

In step 260, the gift receiver may review the list of gifts and edit the list as necessary. In one embodiment, the list may be provided via a mobile application executed on a mobile device, an application executed on a desktop or laptop computer, on a website, etc.

In one embodiment, the gift receiver may remove items that he or she does not want or like from the list. In another embodiment, the gift receiver may be able to rank order items on the list in order of preference. In still another embodiment, the gift receiver may provide feedback regarding each potential gift item, such as "like" and "do not like." Any suitable scale for evaluating the gift items may be used as necessary and/or desired.

In one embodiment, following the gift receiver's review, the application may re-assess the list based on the gift receiver's edits.

Referring to FIG. 3, a flowchart depicting a method for using an intelligent gift registry according to one embodiment. In step 310, the interest(s) of the gift giver may be received. In one embodiment, the interests of the gift giver may be considered to identify common interests for both the gift giver and the gift receiver. In one embodiment, the gift giver's interests may be received from a gift list/registry that the gift giver has created. In another embodiment, the gift giver may be prompted to enter his or her interests before receiving the gift receiver's list. In still another embodiment, the gift giver may be asked to identify which of the gift receiver's interest in which he or she is most interested. Any suitable way of identifying common interests of the gift giver and the gift receiver may be used as necessary and/or desired.

In step 320, the list may be provided to potential gift giver. In one embodiment, the list may be provided via a mobile application executed on a mobile device, an application executed on a desktop or laptop computer, on a website, etc.

In one embodiment, the list may include at least one suggested gift to the gift giver based on, for example, any common interests of the gift giver and gift receiver, the amount that the gift giver wishes to spend, a self-identification of a relationship with the gift receiver (e.g., family, friend, acquaintance, co-worker, etc.), the perceived importance of the event to the gift receiver, purchased gifts, unpurchased gifts, an expected number of gifts remaining to be purchased, etc.

In one embodiment, the list may include an indication of what has been purchased so far, the least expensive gift, the most expensive gift, the average price for a gift, and any other information that may help the gift giver select an appropriate gift. For example, in one embodiment, if a gift list is provided for an upcoming birthday, an average gift price may be helpful for a gift giver to determine how much to spend.

The gift giver may be provided with information on any gifts that have been purchased, the average amount spent, the relationship between the gift giver and gift receiver (e.g., good friend, co-worker, acquaintance, etc.), etc. to assist the gift giver in determining what kind of gift, amount to spend, etc. on the gift that he or she will purchase. In one embodiment, the identification of the gift giver for each purchased gift may be provided to the other gift givers. In another embodiment, the gift givers may remain completely anonymous, or may remain anonymous to certain gift givers.

In one embodiment, the gift receiver may determine the amount of information that may be provided to the gift givers. In another embodiment, the gift giver may decide how much information will be provided to the other gift givers. Other arrangements may be provided as is necessary and/or desired.

In step 330, the gift giver may select a list from the gift list.

In one embodiment, the gift giver may select a gift as part of a group. The gift giver may identify the other gift givers that will share the cost of the item, and the other gift givers may be provided with information regarding the purchase. In one embodiment, the other gift givers may be notified in any suitable manner, including email, text, on a welcome banner to the gift registry website/app, etc.

In one embodiment, the gift giver may indicate that he or she wishes to give the gift as part of a group gift without identifying another giver. The gift giver may indicate an expected number of gift givers to share in purchasing the gift, and the list may be updated to indicate the status (e.g., partially purchased) for the gift. Other gift givers may select to participate in the purchase of the gift. In one embodiment, if no other gift givers elect to participate in the gift, the initial gift giver may be so notified and given the option to pay for the entire gift or to select a different gift.

In one embodiment, the gift may be held until after all participating gift givers in the group gift have paid.

In one embodiment, after a gift is selected, in step 340, the application may process the selection. This may include, for example, identifying at least one merchant that may be able to fulfill the order. The merchant selection may be based on the gift receiver's preferred merchants, the gift giver's preferred merchants, the total cost (item price plus shipping), the merchant's ability to accept a payment, the speed of delivery, the merchant's return policy (e.g., number of days the gift receiver has to return the gift, ease of return, store credit versus a refund, etc.), the number reward points that can be earned by the purchase, the ability of the user to purchase the item with reward points, any available discounts, ongoing relationships with the merchant, retail ecosystems (e.g., specific versions of gifts for Apple versus Kindle, Nook, etc.) etc.

In one embodiment, the at least one merchant may be presented to the gift giver for selection. In one embodiment, the merchants may be listed in order based on at least some of the factors discussed above. The potential benefit for each merchant (e.g., lowest total price, quickest shipping, greatest number of reward points, etc.) may be provided for the gift giver's convenience.

After the gift giver selects a merchant, the application may complete the order, and the selected gift may be removed from the gift list or an indication that the selected gift has been purchased (e.g., graying out, lining out, moving to the end of a list or to a separate list, etc.).

In one embodiment, a gift receipt may be generated for the gift. The gift receipt may be provided by mail, or at a link that may be provided to the gift receiver. The link may not become active until after the gift is received.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ 8 operating system, Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for using an intelligent gift registry, comprising:
    a server comprising at least one computer processor receiving, from an electronic device associated with a gift receiver, an identification of at least one gift receiver interest;
    the server retrieving, from a third party system, a gift receiver purchase history comprising a plurality of items purchased by the gift receiver, wherein the third party system comprises a financial institution system or a merchant system;
    the server receiving, from an electronic device associated with a gift giver, an identification of at least one gift giver interest;
    the server generating a gift giving suggestion list comprising at least one gift giving suggestion that is based on the at least one gift receiver interest, the gift receiver purchase history, and the at least one gift giver interest;
    providing, to the gift giver, the gift suggestion list; and
    receiving, from one of the gift giver, a gift selection from the gift selection list.

2. The method of claim 1, wherein the step of the server generating a gift giving suggestion list comprising at least one gift giving suggestion and based on the at least one gift receiver interest and the at least one gift giver interest comprises:
    the server identifying at least one common interest from the at least one gift receiver interest and the at least one gift giver interest; and
    the server generating the gift giving suggestion list based on the at least one common interest.

3. The method of claim 1, further comprising:
    the server determining at least one supplier for the selected gift; and
    completing the transaction for the selected gift.

4. The method of claim 1, further comprising:
    the server receiving, from the gift receiver, at least one gift idea for the gift receiver;
    wherein the gift giving suggestion list is further based on the at least one gift idea for the gift receiver received from the gift receiver.

5. The method of claim 1, further comprising:
    the server receiving, from the gift receiver, an identification of at least one favorable gift received by the gift receiver;
    wherein the gift giving suggestion list is further based on the at least one favorable gift.

6. The method of claim 1, further comprising:
    the server receiving, from the gift receiver, an identification of at least one unfavorable gift received by the gift receiver;
    wherein the gift giving suggestion list is further based on the at least one unfavorable gift.

7. The method of claim 1, further comprising:
    the server receiving, from the gift receiver, an identification of at least one social network that the gift receiver is a member;
    the server accessing the at least one social network; and
    the server identifying at least one of a gift received by the gift receiver and an interest of the gift receiver;

wherein the gift giving suggestion list is further based on the at least one of a gift received by the gift receiver and an interest of the gift receiver.

8. The method of claim 1, wherein the purchase history is retrieved from an online merchant.

9. The method of claim 1, wherein the purchase history is retrieved from a financial institution that is an issuer of a financial instrument to the gift receiver.

10. The method of claim 1, further comprising:
the server removing at least one outlying purchase from the purchase history based on the at least one gift receiver interest.

11. The method of claim 1, wherein the at least one gift receiver interest is retrieved from a social network website.

12. The method of claim 1, wherein the at least one gift receiver interest is retrieved from a database comprising recommendations from at least one of a family member, a friend, and a social network contact.

13. The method of claim 1, wherein the at least one gift receiver interest is retrieved from a database comprising information about a past gift received by the gift receiver.

* * * * *